(12) United States Patent
Gokhale

(10) Patent No.: US 9,477,414 B1
(45) Date of Patent: Oct. 25, 2016

(54) METHODS AND SYSTEMS FOR IMPROVED CACHING WITH DATA RECOVERY

(71) Applicant: QLOGIC, Corporation, Aliso Viejo, CA (US)

(72) Inventor: Parag Gokhale, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 131 days.

(21) Appl. No.: 14/464,535

(22) Filed: Aug. 20, 2014

(51) Int. Cl.
*G06F 12/00* (2006.01)
*G06F 3/06* (2006.01)
*G06F 12/08* (2016.01)

(52) U.S. Cl.
CPC ............ *G06F 3/0614* (2013.01); *G06F 3/065* (2013.01); *G06F 3/067* (2013.01); *G06F 3/0667* (2013.01); *G06F 3/0679* (2013.01); *G06F 12/0808* (2013.01); *G06F 2212/6046* (2013.01)

(58) Field of Classification Search
CPC .......... G06F 11/0745; G06F 11/1076; G06F 3/067; H04L 67/1097
USPC ................................................. 711/113, 162
See application file for complete search history.

(56) References Cited

U.S. PATENT DOCUMENTS

| | | | | |
|---|---|---|---|---|
| 5,469,555 A | * | 11/1995 | Ghosh | G06F 12/0891 711/133 |
| 5,742,792 A | * | 4/1998 | Yanai | G06F 3/0601 710/1 |
| 5,761,705 A | * | 6/1998 | DeKoning | G06F 11/1666 711/113 |
| 5,815,648 A | * | 9/1998 | Giovannetti | G06F 12/0866 711/E12.019 |
| 6,044,444 A | * | 3/2000 | Ofek | G06F 11/2066 710/1 |
| 2003/0028819 A1 | * | 2/2003 | Chiu | G06F 11/2089 714/5.11 |
| 2005/0021906 A1 | * | 1/2005 | Nakamura | G06F 11/1666 711/113 |
| 2006/0015767 A1 | * | 1/2006 | Sun Hsu | G06F 11/1474 714/5.11 |
| 2006/0047712 A1 | * | 3/2006 | Shitomi | G06F 11/1662 |
| 2008/0270700 A1 | * | 10/2008 | Rao | G06F 12/0813 711/118 |
| 2009/0113420 A1 | * | 4/2009 | Pawlowski | H04L 67/10 718/1 |
| 2012/0089786 A1 | * | 4/2012 | Pruthi | G06F 12/0831 711/141 |
| 2013/0212345 A1 | * | 8/2013 | Nakajima | G06F 3/0605 711/161 |

* cited by examiner

*Primary Examiner* — Mindys Rojas
*Assistant Examiner* — Tasnima Martin
(74) *Attorney, Agent, or Firm* — Klein, O'Neill & Singh, LLP

(57) ABSTRACT

Systems and methods for improved caching with data recovery are disclosed. A write input/output (I/O) request is received from an application to write to a storage area network (SAN) LUN that is cached by a first intelligent storage adapter (ISA) using a cache LUN and mirrored by a second ISA using a mirror LUN. Write through caching is enabled, when either the first ISA or the second ISA has failed. The write I/O request is proceed by a surviving ISA from among the first ISA and the second ISA, where the surviving ISA sends the write I/O to the SAN LUN. Data is copied from a local storage device of the surviving ISA to a recovery LUN; and periodically data is also flushed from the local storage of the surviving ISA to the SAN LUN.

21 Claims, 6 Drawing Sheets

METHODS AND SYSTEMS FOR IMPROVED CACHING WITH DATA RECOVERY

TECHNICAL FIELD

The present disclosure relates to storage systems and more particularly to storage systems using storage adapters in a cluster.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data. For example, storage options include direct-attached storage (DAS), network attached storage (NAS), and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI), and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Continuous efforts are being made to improve storage performance without data loss in the event of component failures.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
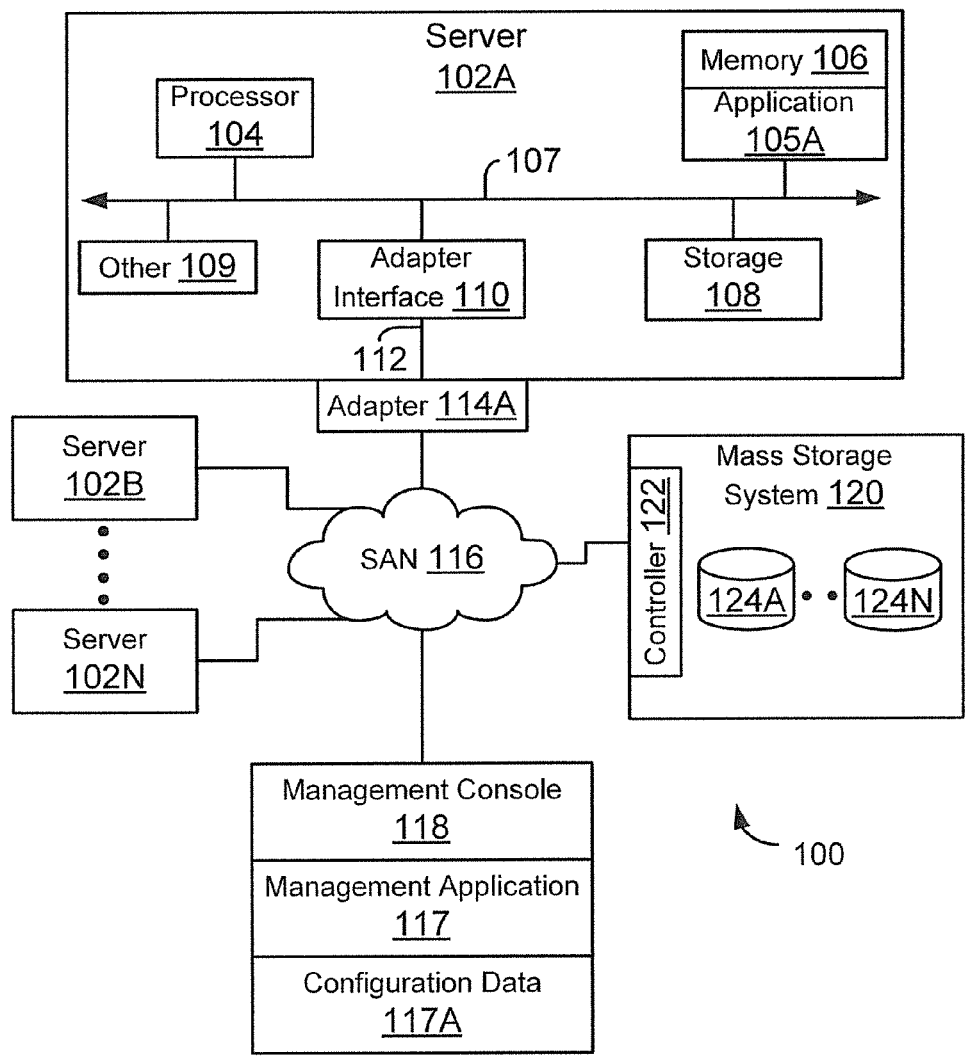
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN)-based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

[Moreover, in an embodiment, the adapter is able to work in conjunction with a second adapter to manage a redundancy system to avoid data loss to the SAN-based storage device.]

System 100:

FIG. 1A is a block diagram of a system 100 configured for use with the present embodiments. System 100 may include a plurality of computing systems 102A-102N (which may also be referred to as server (s) 102 or host system 102), each coupled to an adapter 114A (also referred to as an ISA) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The host system 102A may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 14 can properly execute the application program.

In one embodiment, storage device 108 may be a solid state storage device (which may also be referred to herein as SSD 108). SSDs are becoming popular for servers that may need to store large amounts of data with relatively quick accessibility. ISA 114A described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105A for performing certain functions. For example, application 105A may be a database application, a virtual machine executed in a virtual environment (provided by VMware Corporation, Microsoft Corporation or any other entity), an electronic email application (for example, Microsoft Exchange), or any other application type. Application 105A may issue read and write requests that are processed by ISA 114A, as described below in more detail. Application 105A may also be referred to as a "client."

The host system 102A also includes other devices and interfaces 109, which may include a display device interface, a keyboard interface, a pointing device interface and others. The details of these components are not germane to the inventive embodiments.

ISA 114A may be configured to handle both network and storage traffic while interfacing with other elements. In one embodiment, as described below in detail, ISA 114A may be configured to provide the functionality of a host bus adapter (HBA) by providing connectivity to SAN-(storage area network-) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (or "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a SAN. This functionality would allow Fibre Channel to leverage high speed, for example, 10 Gigabit Ethernet networks while preserving the Fibre Channel protocol. In one embodiment, ISA 114A can be configured to operate as a FCOE adapter. Those of ordinary skill in the art will appreciate, however, that the present embodiments are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (which may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114A may operate as an initiator as well as a target for responding to input/output I/O or IO) requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN.

A LUN that is accessible via a SAN connection may be referred to as a SAN LUN. A LUN at a local storage device managed by ISA 114A and used as a cache may be referred to as cache LUN. A cache LUN may be used to cache data stored at a SAN LUN or another data LUN. The cache LUN is managed by ISA 114A and may not be visible to application 105A but provides quicker access to the stored data than communication with a SAN would typically provide.

Referring back to FIG. 1A, computing system 102 uses an adapter interface 110 to communicate with ISA 114A via a link 112. In one embodiment, link 112 may be a PCI-Express link or any other interconnect type. The adaptive embodiments disclosed herein are not limited to any particular link type.

ISA 114A may communicate and interface with a mass storage system 120 via a SAN 116 that may include one or more switch(es) (may be referred to as fabric switch). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one embodiment, controller 122 may include a processor, an ISA 114A and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

Management application 117 may also be used to configure a cluster having a plurality of ISAs. Details regarding how a cluster is created are provided below.

In one embodiment, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other Servers 102B-102N.

In another embodiment, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
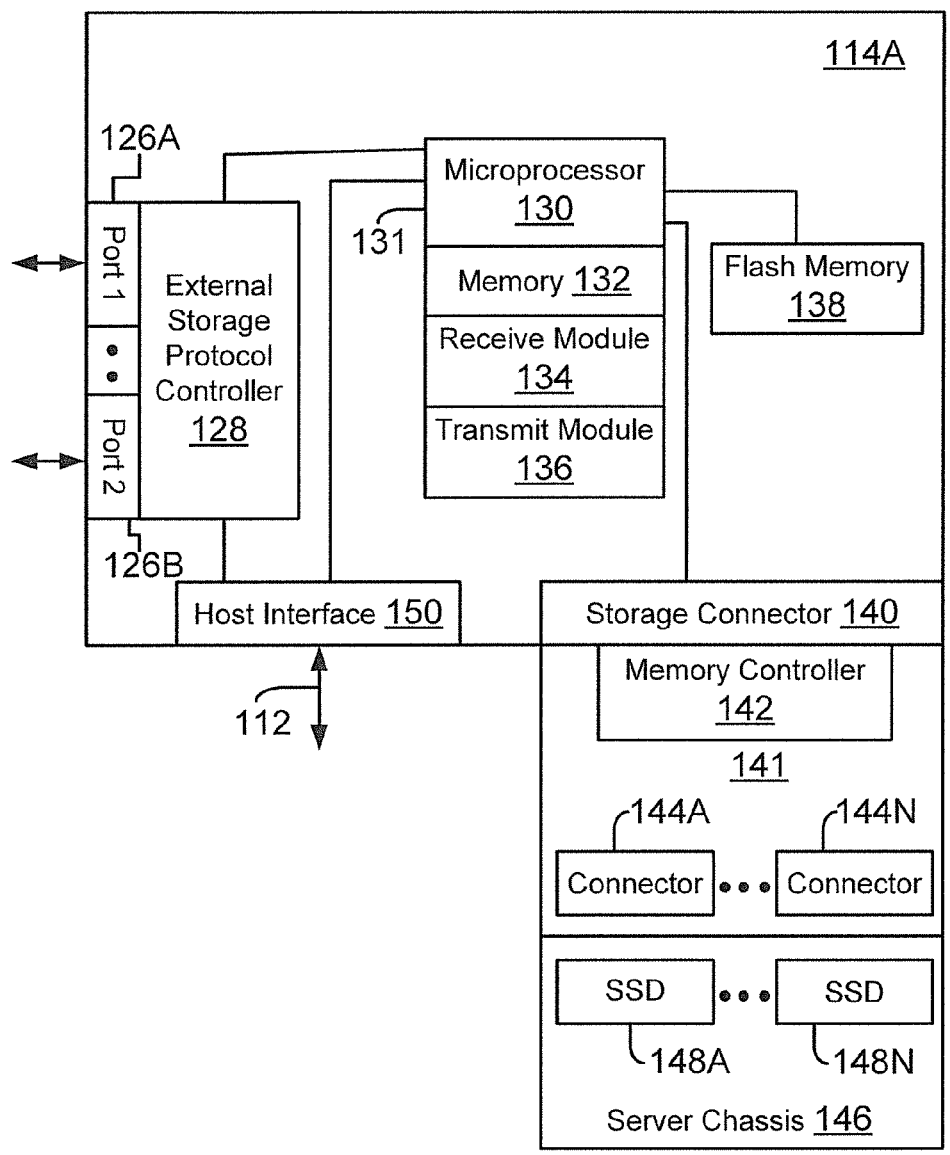
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC4. FC0 is defined by the Fibre Channel specification as the physical layer, which includes cables (fiber optics, twisted-pair), connectors and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. Finally, the FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a processor 130 having access to an adapter memory (which may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (which may also be referred to as a daughter card 141), according to one embodiment. In one embodiment, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

Another embodiment of ISA 114A is configured such that a daughter card has the SSDs 148A-148N on the card itself, rather than on the server chassis 146. A further embodiment of ISA 114A is configured such that the memory controller 142 is on the same card as the other components of ISA 114A. Similarly, in an embodiment, the SSDs 148A-148N also may be on the same card connected via one or more storage connectors.

Figure 1C:
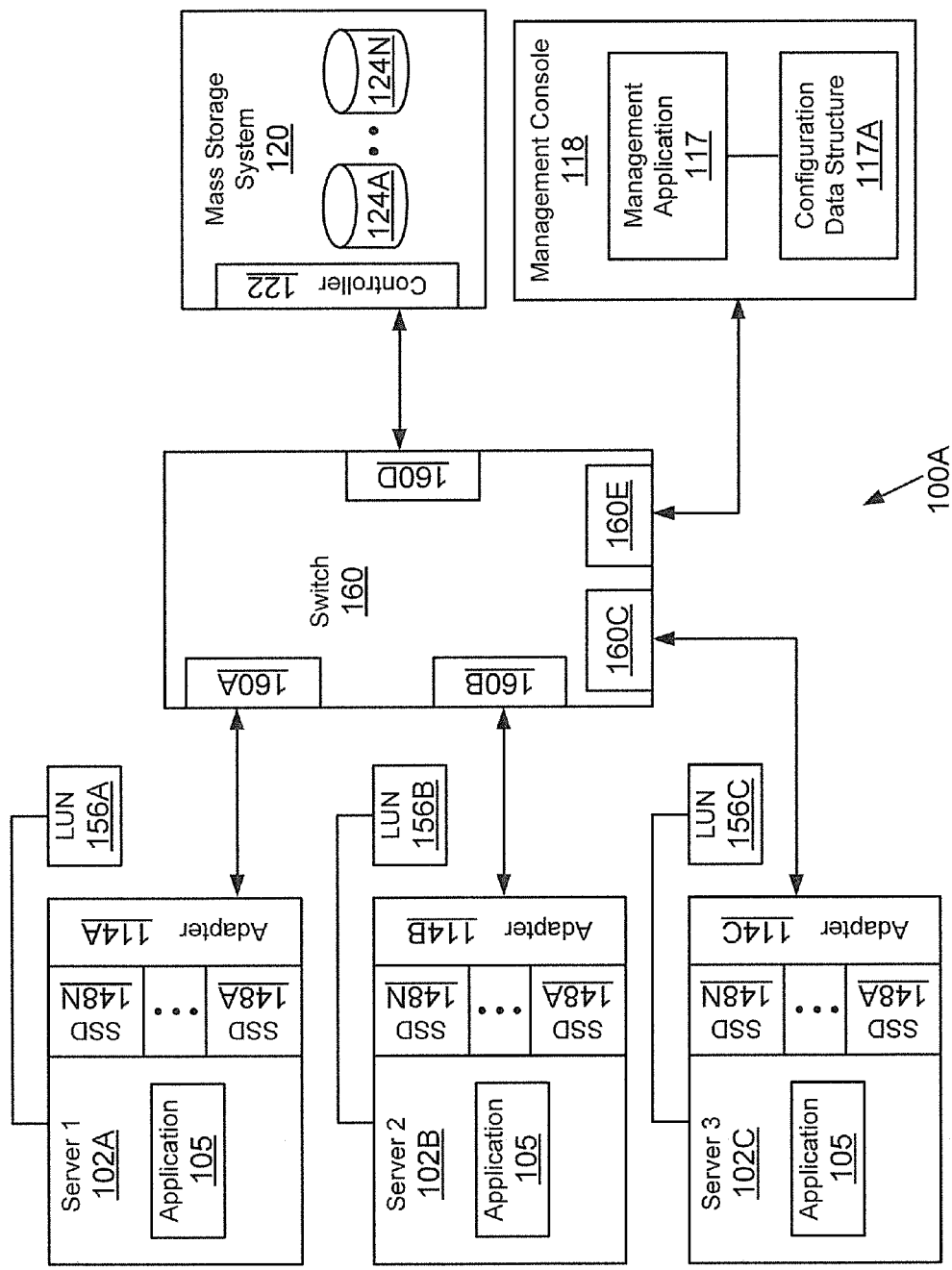
FIG. 1C shows an example of a configuration for using the ISAs, according to one embodiment.

FIG. 1C shows a system 100A where each ISA 114A-114C in or connected to servers 102A-102C are communicatively coupled to a fabric switch 160, according to one embodiment. ISAs 114B and 114C are similar to 114A, described above. Fabric switch 160, which is a part of SAN 116 (shown in FIG. 1A), includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may also be used to configure LUNs 156A-156C that are presented to servers 102A-102C for storing information. LUNs 156A-156C are illustrated merely as representative of a much larger number of LUNs in a given system 100A. The LUNs may be based on storage located at SAN-based mass storage 120 or at a local SSD 148A-148N.

The LUNs 156A-156C may be configured to operate as local LUNs. In this configuration, the LUN may be used as a "boot" LUN. The LUN may be used by the host computing system to which it is presented. One or more ISAs may present the boot LUN to any of the servers that are served by a cluster of ISAs. LUNs 156A-156C may also be configured as SAN mirror LUNs. In such a configuration, the LUN 156B, for example, is a mirror of a LUN that is associated with a SAN-based storage device. LUNs 156A-156C may also be configured as Peer Mirror LUNs. In such a configuration, the LUN 156C, for example, is mirrored across at least two ISAs and hence can be made accessible to at least two servers.

The LUNs 156A-156C may also be accessible by one or more servers via SAN 116 (of FIG. 1A or Switch 160 of FIG. 1C). In this example, a DAS (direct attached storage)-based SSD becomes accessible as SAN storage, while the DAS-based storage is still managed by an application 105A (for example, a database application).

In FIG. 1C, in one embodiment ISA 114A in server 102A acts as a storage protocol controller for LUN 156A, serving up LUN 156A to other initiators, for example, ISA 114E in server 102B and ISA 114C in server 102C. At the same time, ISA 114A also acts as a traditional HBA (initiator) for SAN LUNs at SAN storage devices 124A-124N.

In one embodiment, ISAs 114A-114C operate within a cluster. The cluster may be configured using management application 117 in an embodiment. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105A. In this configuration, ISA 114B becomes the client ISA or the client adapter.

In conventional systems, when a cache owner adapter 114A receives an I/O request to read and write to a SAN LUN 156A, it interfaces with storage system 120 to execute the I/O operation (i.e. read or write data). In order to improve performance, the ISA 114A may create a cache LUN in SSD 148A (see FIG. 1B), for example, to provide more local access to faster storage, rather than only relying on communications with storage system 120. In such a system, the ISA 114A may not immediately forward all I/O requests to update SAN LUN 156A to storage system 120 and rather rely on updating the cache LUN. This is called a "write-back" configuration, where the ISA 114A updates the cache LUN and then waits until there is time to forward the command to the storage system 120. In another configuration, called "write-through," the ISA 114A would execute the I/O command on the cache LUN and also forward it to the storage system 120 at the same time.

Figure 2:
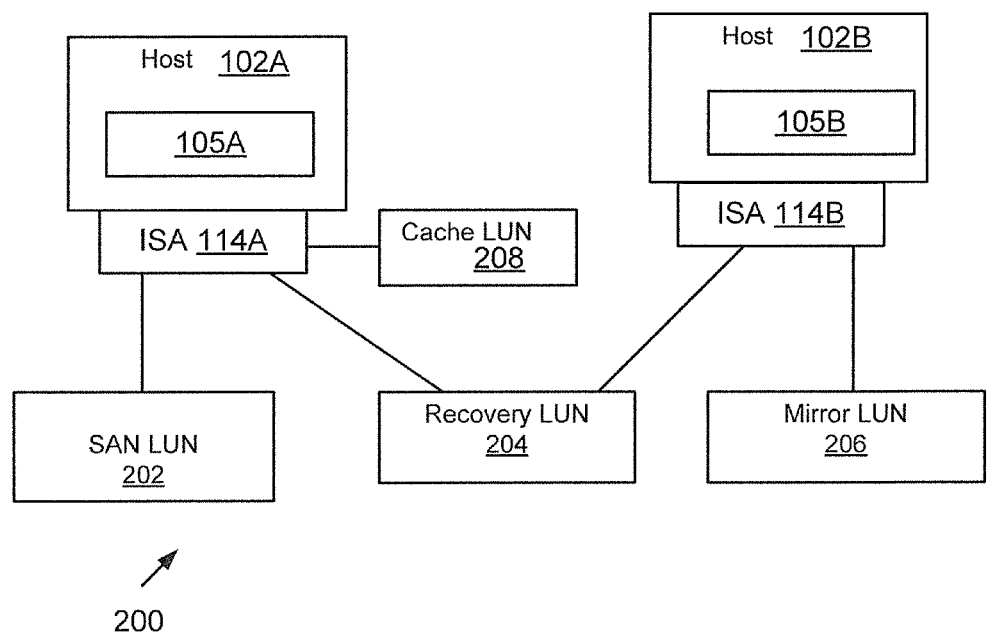
FIG. 2 shows an example of a recovery LUN according to one embodiment of the present disclosure.

FIG. 2 shows an example of a cluster 200 configured to provide data redundancy in a caching system as described. In this embodiment, ISA 114A is a cache owner and ISA 114B is a cache client adapter for Cache LUN 208. In this configuration, an operator may select to operate in a "write-back" mode with mirroring to provide data protection. In this example, ISA 114A and ISA 114B act in concert to provide quick access to data stored in Cache LUN 208, while also providing data redundancy and security to SAN LUN 202. In this configuration, ISA 114A manages cache LUN 208, typically stored in a local SSD, for example, SSD 148A (see FIG. 1B). Additionally, ISA 114B manages a Mirror LUN 206, typically stored in its own SSD. In order to provide redundancy, application 105A may issue an I/O command. ISA 114A receives the command and carried out the operation at cache LUN 208. It also forwards the I/O command to ISA 114B, which carries out the operation on mirror LUN 206. When both the cache LUN operation and the mirror LUN operation are acknowledged, ISA 114A can acknowledge completion of the operation to application 105A (whether or not the operation has been forwarded to SAN LUN 202 (on storage system 120).

However, if either ISA 114A or ISA 114B fail for any reason, there may no longer be data redundancy. Accordingly, the embodiment illustrated in FIG. 2, further includes recovery LUN 204. Recovery LUN 204 may be shared by ISA 114A and 114B and provides a dedicated solution to flushing "dirty" data from the cache LUN 208 or Mirror LUN 206. Dirty data includes data at cache LUN or mirror LUN 206 that has not been copied to the SAN LUN 202. Recovery LUN 204 can be located in storage local to host 102A, local to host 102B, or in SAN or NAS storage with which ISAs 114A and 114B can communicate.

Figure 3:
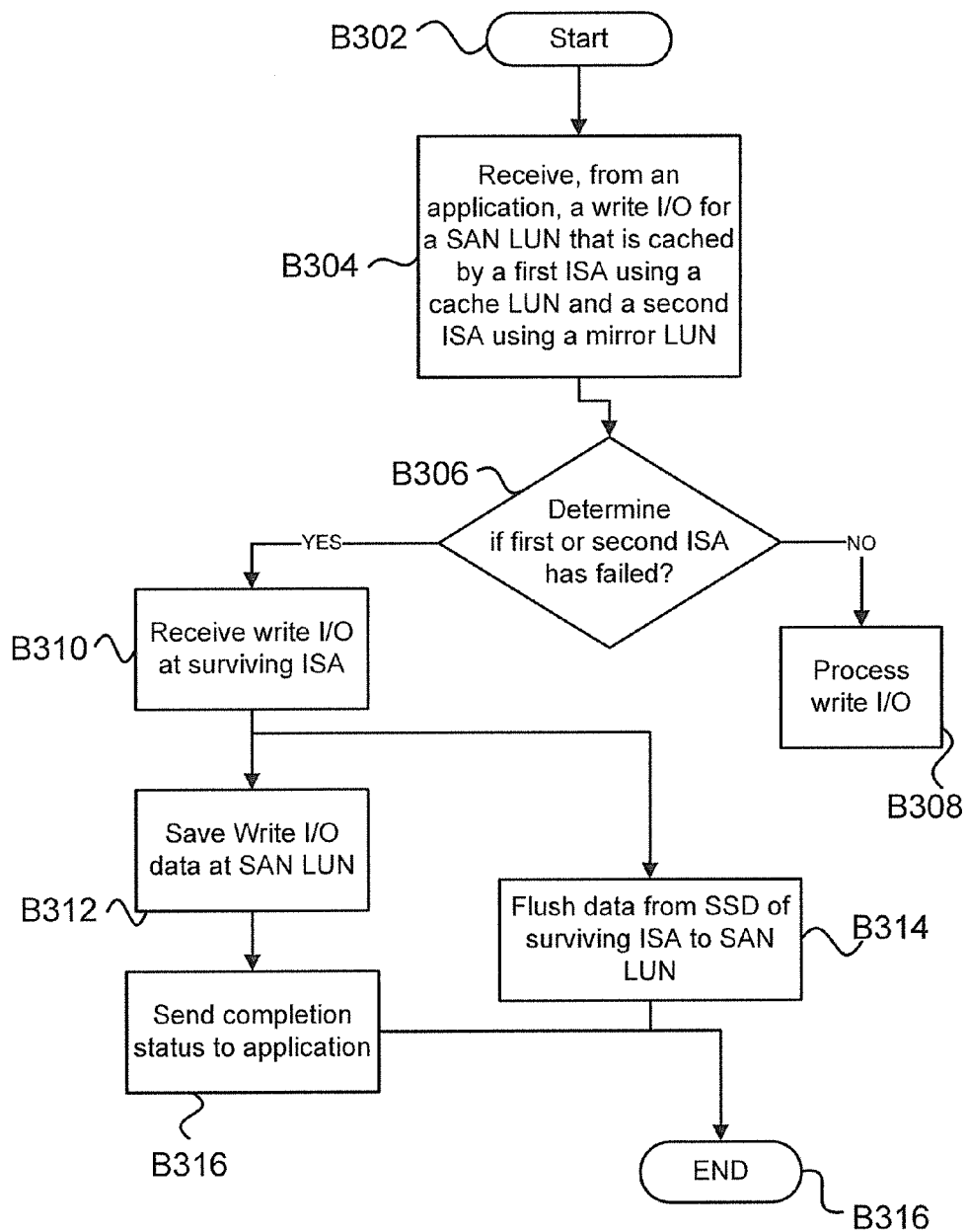
FIGS. 3-4 show process flows according to various embodiments of the present disclosure.

To better understand the solutions of the present embodiments, FIG. 3 illustrates a process without recovery LUN 204. Starting with B302, a system similar to those previously illustrated includes host 102A and host 102B initiated and operational, each having an associated ISA (114A and 114B) which are also initiated and operational. ISA 114A also manages a cache LUN 208, caching for SAN LUN 202, and ISA 114B has a mirror LUN 206.

In block B304, ISA 114A receives a write I/O from an application (105A) for a SAN LUN (202). In B306, the process determines if ISA 114A and cache LUN 208 have failed or if ISA 114E and mirror LUN 206 have failed. When ISA 114A has failed, then the application 105A receives an error message. When ISA 114B has failed, then ISA 114A receives an error message. If none have failed, the ISA 114A will handle the write I/O normally by using cache LUN 208 to write the I/O and forwarding the I/O to ISA 114B for mirroring using mirror LUN 206 in block B308.

If a failure of one of the ISAs or the cache or mirror LUN is detected, the write I/O is directed to the surviving ISA in block B310. In block B312, the write I/O data is forwarded to and saved at the SAN LUN 202, which sends back a completion status to the surviving ISA which is forwarded to the application 105. Additionally, the surviving ISA flushes its data from the local SSD (either the cache LUN or mirror LUN, according to which ISA is surviving) in block B314, so that data that was cached is not lost. At this point the process ends at B318. Process blocks B312 and B314 are taxing on SAN LUN 202 because the flushing operation to the SAN LUN may interfere with other I/O requests that may be in transit or waiting to be executed.

Figure 4:
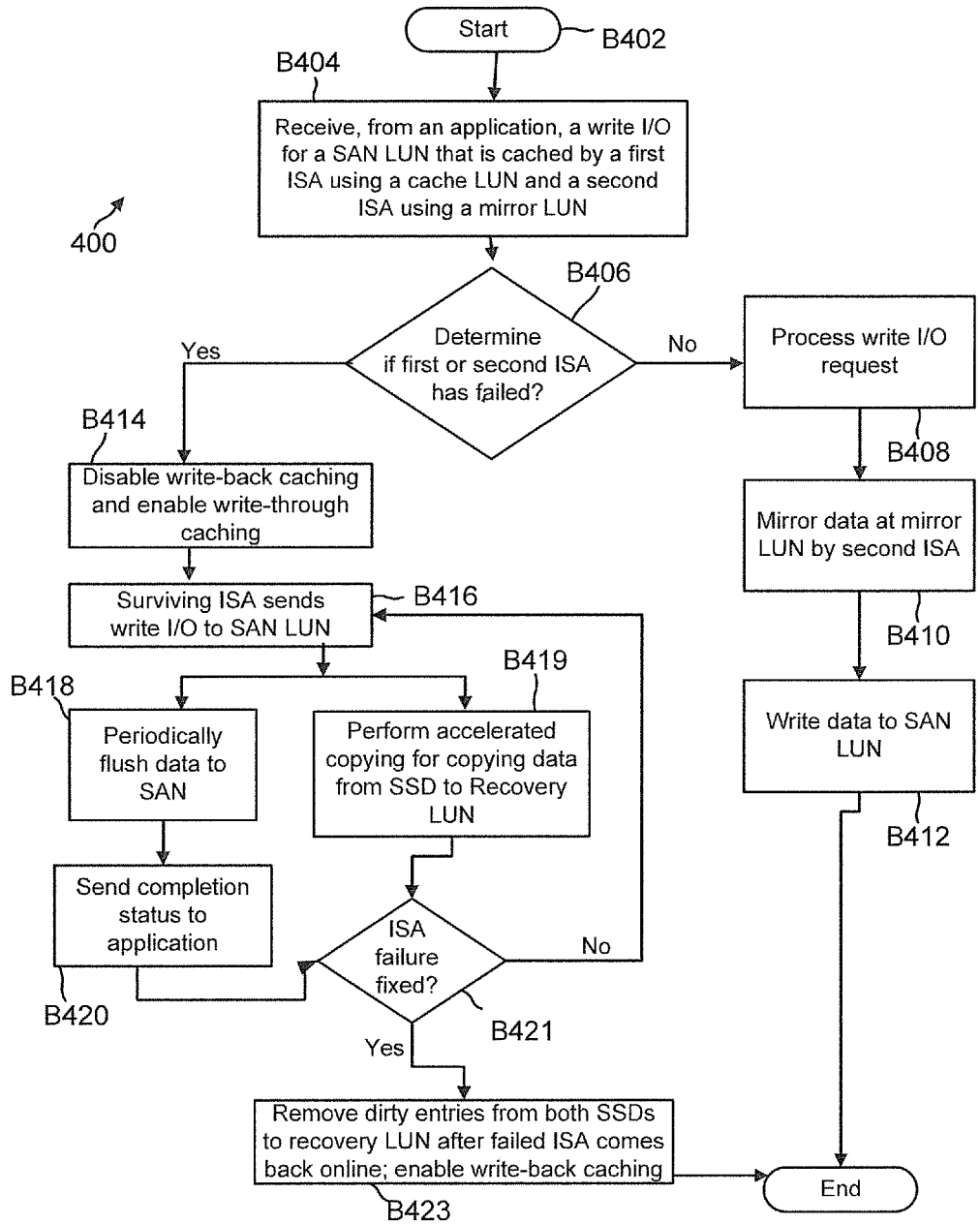

FIG. 4 illustrates a process according to an embodiment with a dedicated recovery LUN available to the ISAs which may avoid multiple high priority I/O demands on the SAN. Starting with B402, a system similar to the system illustrated in FIG. 2 includes host 102A and host 102B that are initiated and operational. Each host is associated with an ISA (114A and 114B) which are also initiated and operational in a write-back setting. As an example, ISA 114A manages the cache LUN 208, caching for SAN LUN 202, and ISA 114B has a mirror LUN 206. Furthermore, recovery LUN 204 is also initiated and available to the ISAs.

In block B404, a write I/O may be received from an application 105A. At block B406, it is determined if either ISA 114A or 114B has failed. When neither has, the system is performing according to normal operation, and ISA 114A processes the write request in block B408 by writing the data to cache LUN 208. ISA 114A then sends the I/O request to the second ISA (114B) for mirroring at the mirror LUN 206 in block B410. At block B412, when system resources allow, the I/O will be sent to the SAN LUN for the data to be written. This can be on a low priority without concerns over loss of data, because the system knows that the cache LUN and mirror LUN are redundant. In an embodiment, a low priority thread or process may also carry out copy operations to the recovery LUN. This may be controlled by either ISA 114A or ISA 114B. For example, ISA 114B may perform a low-priority continuous copy operation from the mirror LUN to the recovery LUN.

On the other hand, if a failure of either ISA is detected, the process proceeds with block B414, which changes the configured write-back caching to write-through caching. This allows the surviving ISA to write data to a SAN LUN, as soon as it gets the write data. In an embodiment, caching operations are still carried out with the surviving ISA also writing the I/O data to its associated LUN (for example, mirror LUN 206 in the case where ISA 114B remains operational).

In block B416, the surviving ISA sends the write I/O to the SAN LUN 202. In block B419, the surviving ISA performs accelerated copying of the data from its associated LUN/SSD to the recovery LUN. In an embodiment performing copy operations to the recovery LUN, during normal operations as described above, the accelerated copy may include making the copy operation a high priority thread. If the surviving ISA was not carrying out the recovery LUN copy operation, the accelerated copy may still be more efficient as only a portion of the cache LUN or mirror LUN will need to be copied in an accelerated manner. In parallel, in block B418, I/O commands can be forwarded to the SAN LUN on a low priority, because the recovery LUN is already receiving the dirty data entries. In one embodiment, these I/O commands may be based on dirty cache from the surviving ISA's cache LUN. In another embodiment, the I/O commands may be based on data in the recovery LUN. As these commands are processed, the associated dirty entries from recovery LUN can be removed. In another embodiment, the dirty entries associated with I/Os forwarded to the SAN are updated to indicate that they have already been sent to the SAN LUN. This may assist in providing more efficient recovery processing as described in block B423. Completion of the I/O to the SAN can then be acknowledged to the application in block B420. At block B421, the process can then check to see if the ISA failure has been fixed. If not, the process returns to block B416 to process additional write I/Os from an application. Otherwise, the process continues to block B423.

Using the recovery LUN in this way, while an ISA is down, can help the application continue at a normal pace, as dirty entries can be copied to the recovery LUN and can be flushed to the SAN independent of the I/O of the application. In block B423, after the failed ISA comes back online, the recovery LUN entries can be compared to those of both the cache LUN and mirror LUN to help ensure that the SAN I/Os are brought up to date. Older entries relating to I/Os performed in block B418, can be removed from the recovery LUN. In another embodiment, the recovery LUN 204 or the surviving cache LUN can bring the returning LUN back up to date as well. For example, if the mirror LUN 206 or ISA 114B had failed, it may miss several I/O operations. When it comes back online, it can be updated through processing with the cache LUN 208 and/or the recovery LUN 204, in an embodiment. In block B423, write-through caching can then be disabled and write-back caching can be enabled.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine-implemented method, comprising:
   receiving a write input/output (I/O) request from an application to write to a storage area network (SAN) LUN that is based on storage space at a storage device accessible via a network connection, wherein data for the SAN LUN is cached by a first intelligent storage adapter (ISA) using a cache LUN based on storage space at a first storage device of the first ISA and mirrored by a second ISA using a mirror LUN that is based on storage space at a second storage device of the second ISA; wherein the first ISA is coupled to a first computing device and the second ISA is coupled to a second computing device and both the first ISA and the second ISA provide access to SAN based storage operating as host adapters and to local storage that is also managed by each of the first ISA and the second ISA;
   disabling write back caching and enabling write-through caching, when either the first ISA or the second ISA has failed;
   processing the write I/O request by a surviving ISA from among the first ISA and the second ISA, where the surviving ISA sends the write I/O to the SAN LUN via the network connection;
   copying dirty data from a local storage device of the surviving ISA to a recovery LUN via the network connection; wherein the dirty data from the surviving ISA is data that has not been transferred to the SAN LUN and the dirty data is copied to the recovery LUN at a higher priority than the data sent to the SAN LUN by the surviving ISA; and
   periodically flushing data from the local storage of the surviving ISA to the SAN LUN.

2. The machine-implemented method of claim 1, wherein the cache LUN is based on storage space at a solid state storage device (SSD) managed by the first ISA and the mirror LUN is based on storage space at a SSD managed by the second ISA.

3. The machine-implemented method of claim 1, wherein processing the write I/O includes storing a write I/O data to the local storage device of the surviving ISA.

4. The machine-implemented method of claim 1, further comprising:
   copying any data stored at local storage of both the first ISA and the second ISA to the recovery LUN, after the failed ISA becomes available again.

5. The machine-implemented method of claim 1, further comprising:
   accepting a second write I/O request at the surviving ISA; and
   storing data of the second write I/O at the local storage device of the surviving ISA.

6. The machine-implemented method of claim 1, further comprising:
   immediately forwarding the second write I/O request to the SAN LUN as part of the enabled write-through caching.

7. The machine-implemented method of claim 1, wherein the recovery LUN is based on storage that is accessible via the SAN.

8. A non-transitory, machine readable storage medium storing executable instructions, which when executed by a machine, causes the machine to perform a method, the method comprising:
   receiving a write input/output (I/O) request from an application to write to a storage area network (SAN) LUN that is based on storage space at a storage device accessible via a network connection, wherein data for the SAN LUN is cached by a first intelligent storage adapter (ISA) using a cache LUN based on storage space at a first storage device of the first ISA and mirrored by a second ISA using a mirror LUN that is based on storage space at a second storage device of the second ISA; and wherein the first ISA is coupled to a first computing device and the second ISA is coupled to a second computing device and both the first ISA and the second ISA provide access to SAN based storage operating as host adapters and to local storage that is also managed by each of the first ISA and the second ISA;
   disabling write back caching and enabling write-through caching, when either the first ISA or the second ISA has failed;
   processing the write I/O request by a surviving ISA from among the first ISA and the second ISA, where the surviving ISA sends the write I/O to the SAN LUN via the network connection;
   copying dirty data from a local storage device of the surviving ISA to a recovery LUN via the network connection; wherein the dirty data from the surviving ISA is data that has not been transferred to the SAN LUN and the dirty data is copied to the recovery LUN at a higher priority than the data sent to the SAN LUN by the surviving ISA; and
   periodically flushing data from the local storage of the surviving ISA to the SAN LUN.

9. The storage medium of claim 8, wherein the cache LUN is based on storage space at a solid state storage device (SSD) managed by the first ISA and the mirror LUN is based on storage space at a SSD managed by the second ISA.

10. The storage medium of claim 8, wherein processing the write I/O includes storing a write I/O data to the local storage device of the surviving ISA.

11. The storage medium of claim 8, the method further comprising:

copy any data stored at local storage of both the first ISA and the second ISA to the recovery LUN, after the failed ISA becomes available again.

12. The storage medium of claim 8, the method further comprising:
accepting a second write I/O request at the surviving ISA; and
storing data of the second write I/O at the local storage device of the surviving ISA.

13. The storage medium of claim 8, further comprising:
immediately forwarding the second write I/O request to the SAN LUN as part of the enabled write-through caching.

14. The storage medium of claim 8, wherein the recovery LUN is based on storage that is accessible via the SAN.

15. A system comprising:
a processor executing instructions out of a memory for:
receiving a write input/output (I/O) request from an application to write to a storage area network (SAN) LUN that is based on storage space at a storage device accessible via a network connection, wherein data for the SAN LUN is cached by a first intelligent storage adapter (ISA) using a cache LUN based on storage space at a first storage device of the first ISA and mirrored by a second ISA using a mirror LUN that is based on storage space at a second storage device of the second ISA; and wherein the first ISA is coupled to a first computing device and the second ISA is coupled to a second computing device and both the first ISA and the second ISA provide access to SAN based storage operating as host adapters and to local storage that is also managed by each of the first ISA and the second ISA;
disabling write back caching and enabling write-through caching, when either the first ISA or the second ISA has failed;
processing the write I/O request by a surviving ISA from among the first ISA and the second ISA, where the surviving ISA sends the write I/O to the SAN LUN via the network connection;
copying dirty data from a local storage device of the surviving ISA to a recovery LUN via the network connection; wherein the dirty data from the surviving ISA is data that has not been transferred to the SAN LUN and the dirty data is copied to the recovery LUN at a higher priority than the data sent to the SAN LUN by the surviving ISA; and
periodically flushing data from the local storage of the surviving ISA to the SAN LUN.

16. The system of claim 15, wherein the cache LUN is based on storage space at a solid state storage device (SSD) managed by the first ISA and the mirror LUN is based on storage space at a SSD managed by the second ISA.

17. The system of claim 15, wherein processing the write I/O includes storing a write I/O data to the local storage device of the surviving ISA.

18. The system of claim 15, the processor further executing instructions out of the memory for:
copy any data stored at local storage of both the first ISA and the second ISA to the recovery LUN, after the failed ISA becomes available again.

19. The system of claim 15, the processor further executing instructions out of the memory for:
accepting a second write I/O request at the surviving ISA; and
storing data of the second write I/O at the local storage device of the surviving ISA.

20. The system of claim 15, the processor further executing instructions out of the memory for:
immediately forwarding the second write I/O request to the SAN LUN as part of the enabled write-through caching.

21. The system of claim 15, wherein the recovery LUN is based on storage that is accessible via the SAN.

* * * * *